(12) United States Patent
Tan

(10) Patent No.: US 7,389,500 B2
(45) Date of Patent: Jun. 17, 2008

(54) SELECTIVE PRE-COMPILATION OF VIRTUAL CODE TO ENHANCE BOOT TIME EMULATOR PERFORMANCE

(75) Inventor: Victor Tan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 11/177,130

(22) Filed: Jul. 8, 2005

(65) Prior Publication Data

US 2007/0011666 A1 Jan. 11, 2007

(51) Int. Cl.
*G06F 9/45* (2006.01)
(52) U.S. Cl. ...................... 717/148; 717/137
(58) Field of Classification Search ............. 717/148, 717/137
See application file for complete search history.

(56) References Cited

U.S. PATENT DOCUMENTS

| | | | | |
|---|---|---|---|---|
| 5,097,407 | A | 3/1992 | Hino et al. | 395/375 |
| 6,273,822 | B1 | 8/2001 | Tanaka | 463/43 |
| 6,338,160 | B1 * | 1/2002 | Patel et al. | 717/139 |
| 6,354,940 | B1 | 3/2002 | Itou et al. | 463/8 |
| 6,607,445 | B1 | 8/2003 | Gendo et al. | 463/43 |
| 6,637,025 | B1 * | 10/2003 | Beadle et al. | 717/148 |
| 6,704,926 | B1 * | 3/2004 | Blandy et al. | 717/148 |
| 6,774,885 | B1 | 8/2004 | Even-Zohar | 345/156 |
| 6,820,252 | B2 * | 11/2004 | Sakamoto et al. | 717/136 |
| 6,826,749 | B2 * | 11/2004 | Patel et al. | 717/148 |
| 6,842,894 | B1 | 1/2005 | Havermose | 717/148 |
| 7,080,362 | B2 * | 7/2006 | Patel et al. | 717/139 |
| 7,089,544 | B2 * | 8/2006 | Hickson | 717/148 |
| 7,191,434 | B2 * | 3/2007 | Renouf | 717/148 |
| 7,225,436 | B1 * | 5/2007 | Patel | 717/139 |
| 7,225,456 | B2 * | 5/2007 | Kitsukawa et al. | 725/43 |
| 7,228,533 | B2 * | 6/2007 | Sokolov | 717/148 |
| 2004/0239675 | A1 | 12/2004 | Regelous | 345/473 |
| 2004/0266506 | A1 | 12/2004 | Herbrich et al. | 463/6 |

OTHER PUBLICATIONS

Shilov, A. et al., "3DMark05: The Future of Computer Games in Numbers", X-bit labs-Articles, Sep. 29, 2004, 16 pages.
"Jit Is for Protypes", Jul. 8, 2005, 3 pages.

* cited by examiner

*Primary Examiner*—Todd Ingberg
(74) *Attorney, Agent, or Firm*—Woodcock Washburn LLP

(57) ABSTRACT

A method and computer-readable medium perform a pre-boot scan of an emulated binary to detect a function that is above a predetermined complexity threshold. The detected function may then be precompiled during a boot-up process. The pre-boot scan may also detect a function that falls below a second predetermined complexity threshold. The detected function may be placed inline with the code body. Just-in-time translation may then be performed at runtime.

14 Claims, 4 Drawing Sheets

SELECTIVE PRE-COMPILATION OF VIRTUAL CODE TO ENHANCE BOOT TIME EMULATOR PERFORMANCE

FIELD OF THE INVENTION

The present invention relates generally to the field of software emulation. More particularly, the present invention relates to the selective pre-compilation and inlining of virtual code.

BACKGROUND OF THE INVENTION

When a software application such as a video game or the like is compiled, it is typically converted into virtual code, such as an intermediate emulated binary that provides a description of the application as well as instructions as to how the application is to run. A software emulator performs a binary translation of a software application's intermediate binary at some point before the application is executed. Binary translation refers to the process of converting the intermediate binary into a machine-executable binary that is specific to the type of processor that will execute the code. The executable binary is then ready to be executed by the processor for which it has been formatted.

One such binary translation method is referred to as "just-in-time" ("JIT") binary translation, which, as the name suggests, is a binary translation of software code that occurs just before the code is to be executed. As a result, a particular intermediate binary may be used on a variety of processors and computing platforms, as the processor-specific changes that need to occur for the code to run successfully do not happen until just prior to execution. JIT translation also provides relatively quick load and boot times because binary translation does not occur during boot-up.

Unfortunately, JIT translation may adversely affect the execution of the code at runtime. For example, a typical gaming system may be able to perform JIT translation during runtime for most average-complexity graphics functions within the code without having adverse effects on the code's execution (i.e., without affecting graphics rendering). However, if a particularly complex graphics function is encountered—such as one involving a large segment of artificial intelligence ("AI")—there may not be sufficient processor resources available to perform both the function translation and the code execution. A user may therefore notice a momentary pause in code execution as a visible "flicker" or "stutter" during playback. As programmers constantly strive for increased graphics realism, such delays are becoming more and more undesirable.

Another translation method involves the use of a software precompiler. A precompiler performs a binary translation of the entire static intermediate binary that represents a software application's code prior to execution. The translation typically occurs when the software is being loaded during a boot-up process (at "load time"). While the use of a precompiler provides for faster, interruption-free execution at runtime, the initial load time when the precompiler performs the binary translation is lengthened. Thus, a user may experience an unreasonably long system boot time and, as a result, precompilers are typically not used for large programs.

Another problem occurs at runtime in connection with executing relatively simple functions within a machine-executable binary. For example, many functions involve calls from the main body of the code to a subroutine. The call to the subroutine and the call return from the subroutine (referred to as "context switching") require processing time. For most functions, the processing time required for the context switch is negligible when compared to the processing time required to execute the function itself. However, if the function is very small the processing time required for the context switch may become a sizable percentage of the overall execution time required for the function. As a result, the execution of such a function as a subroutine is less efficient than if the function was simply executed within the main body of the code. This inefficiency can adversely affect the performance of JIT translation as well as code execution because of the extra processing time that is taken up by the context switch. While executing such a function as a subroutine may be inefficient, such subroutines in general typically serve as a convenient tool for software developers. Thus, simply creating code that has all such functions located in the main body of the code is undesirable.

Accordingly, there is a need for a mechanism that overcomes the above shortcomings and drawbacks. The present invention satisfies this need.

SUMMARY OF THE INVENTION

In view of the above shortcomings and drawbacks, a method and computer-readable medium are provided that perform a pre-boot scan of an emulated binary to detect a function that is above a predetermined complexity threshold. The detected function may then be precompiled during a boot-up process. The pre-boot scan may also detect a function that falls below a second predetermined complexity threshold. The detected function may be placed inline with the code body. Just-in-time translation may then be performed at runtime, where the precompiled functions may be directly executed without further translation, and any function that was moved inline may be executed without a context switch.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
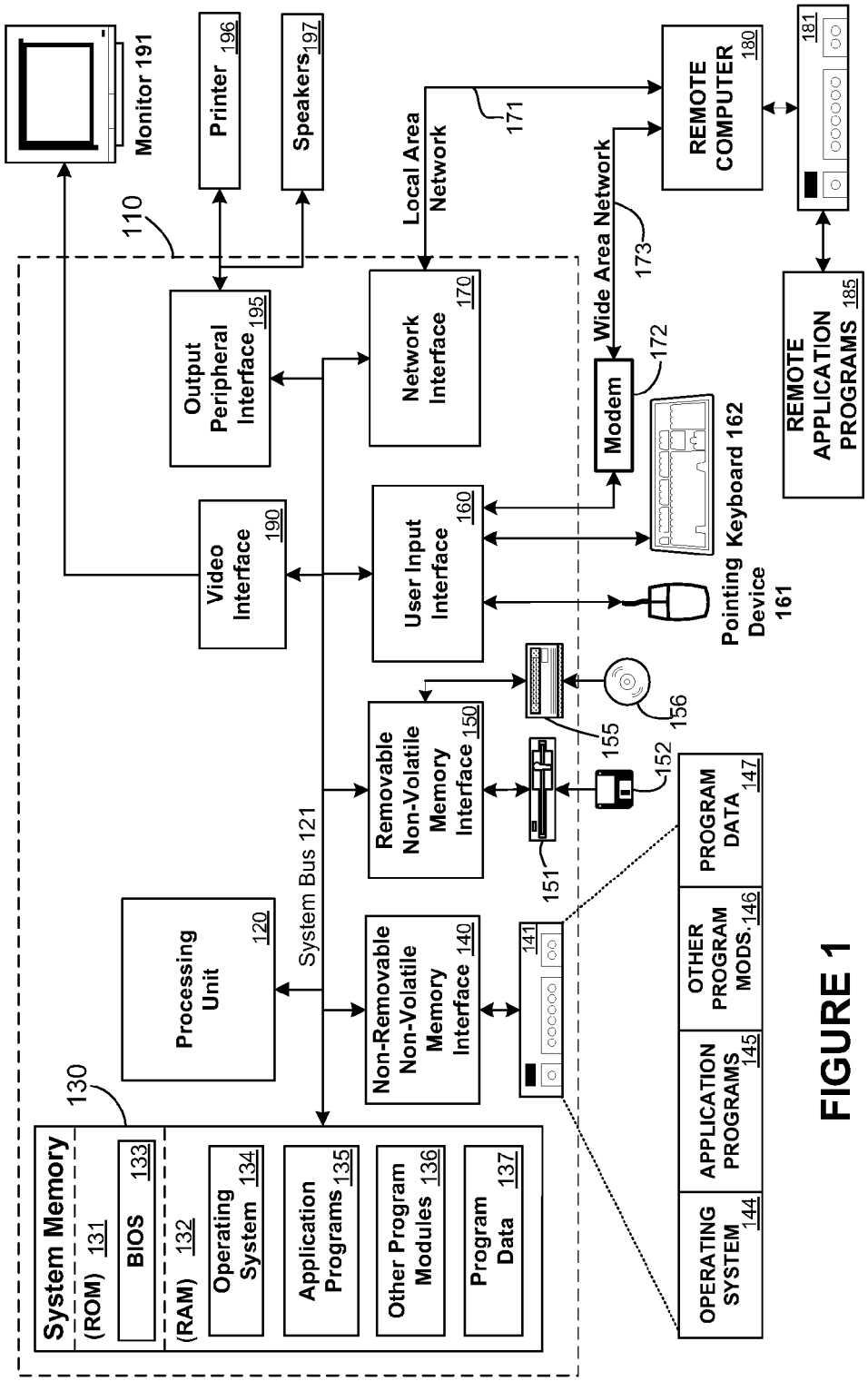
FIG. 1 is an example computing environment in which aspects of the present invention may be implemented.

FIG. 1 illustrates an example of a suitable computing system environment 100 on which the invention may be implemented. FIG. 1 is identified as prior art, however when the computer 110 is configured to practice aspects of the present disclosure it becomes a special purpose computer 110 embodying the disclosure and is not prior art. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Embodiments

In the discussion that follows, details relating to code emulation and binary translation are assumed to be known to those skilled in the art. Accordingly, such details are largely omitted herein for the sake of clarity and explanation. In addition, an example embodiment involving graphics rendering in the context of gaming software is used herein solely for purposes of explanation, and is not intended to limit the invention to any such embodiment.

An embodiment of the present invention selectively combines JIT translation and precompilation techniques to avoid pauses during a software application's code execution. A pre-boot scan of such code's emulated binary may be performed to detect complex functions within the binary. During the software's boot process, an embodiment precompiles the detected complex functions. At runtime, a JIT translation technique is used for the remainder of the binary, while the precompiled functions may be executed directly and without further translation. In addition, during such a pre-boot scan, an embodiment may detect very simple functions and selectively relocate them to the main body of the code (a process referred to herein as "inlining"). At runtime, the context switching that would otherwise be necessary to execute the functions can be avoided.

A pre-boot scan of an embodiment may increase the amount of time required to perform the initial boot process. However, because the precompilation and inlining operations are applied selectively, the increase in boot time may be managed to remain within an acceptable limit. Thus, code execution may be improved to avoid noticeable pauses without overextending the application's boot time.

Figure 2:
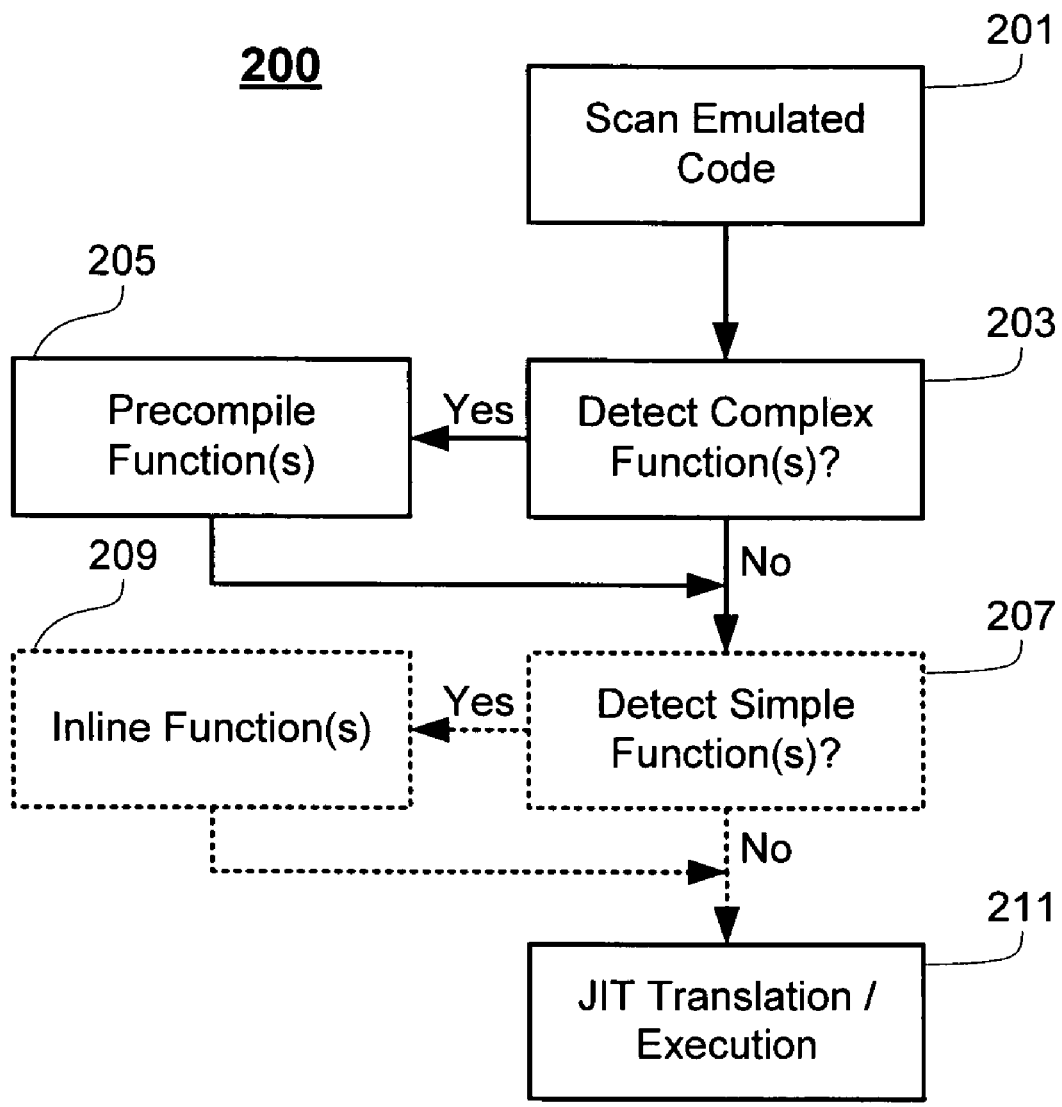
FIG. 2 is a flowchart illustrating an example method in accordance with an embodiment of the present invention.

Referring now to FIG. 2, an example method 200 of an embodiment is illustrated. At step 201 emulated code, such as an intermediate binary of a video game, for example, is scanned. Any type of scanning mechanism may be used. For example, one such scanning method is described in commonly-assigned U.S. application Ser. No. 11/128,699, filed May 12, 2005 and entitled "Function-Level Just-in-Time Translation Engine with Multiple Pass Optimization," which is hereby incorporated by reference in its entirety. Scanning may involve, for example, moving an instruction pointer or the like through the emulated code flow according to relative instruction displacement techniques or the like, as should be known to those skilled in the art. As the scan proceeds through the emulated code, function boundaries are determined to establish the complexity of each function within the emulated code. The term "complexity" as used herein refers to any measure of processing time or resources that would be required to compile and/or execute the function. For example, complexity may be measured in terms of function size (e.g., number of lines of code, etc.), processing difficulty or the like. For instances involving functions that are referenced through function pointers, or another form of absolute addressing, a binary-specific reference to such functions may be used to enable the precompilation of step 211, below, to take place.

After the scanning of step 201 has completed, at step 203 a determination is made as to whether one or more complex functions were detected. As noted above, what constitutes a "complex" function may be based on any criteria. In addition, a predetermined threshold may be selected so that only functions exceeding the threshold are determined to be complex. As noted above, a predetermined threshold may be in terms of lines of code. Thus, if a function contains more than the threshold number of lines of code, the function may be determined to be complex. The threshold may be predetermined based on any number of factors. For example, the precompilation of step 205, to be discussed below, may increase the overall boot-up time of the application. A developer or the like may wish to keep the increase in boot-up time caused by such precompilation to within a certain limit. Thus, the threshold may be selected, for example, to result in as many functions determined to be complex as can be precompiled within the time limit.

If the determination of step 203 is that no functions are complex, method 200 may proceed to optional step 207. If the determination of step 203 is that one or more functions are complex, then at step 205 the complex functions are compiled—which is referred to herein as "precompilation" because such compilation takes place prior to the execution of the code (and prior to any JIT translation). According to an embodiment, once the function has been precompiled according to step 205, it is ready for execution without further processing.

At optional step 207, a determination is made as to whether one or more "simple" functions are detected. As was the case with complex functions, what constitutes a simple function may be based on any criteria. For example, a simple function may be defined as a subroutine that has less than a threshold number of lines of code. The threshold may be selected based on the processing time required by the context switch as compared to the processing time required to execute the subroutine, for example. Additional factors may also be considered, including application-specific factors.

For example, a particular subroutine may have fewer than the threshold number of lines of code but may appear numerous times throughout the application's code. The inlining of a function may involve essentially copying the lines of code within the function to the main body of code in place of the corresponding function call. Thus, during execution the function's code may be compiled and executed inline without having to context switch to and from the subroutine from which the code originated. Such copying may increase the overall size of the application because of the duplicated data. As a result, subroutines that appear numerous times throughout an application may necessitate so much duplication that a processing benefit to be gained from inlining the functions may be offset by increased storage requirements, excessive processing time required for inlining numerous functions, etc. As a result, such functions may not be determined to be simple, even if they would otherwise qualify according to the threshold.

Figure 4A:
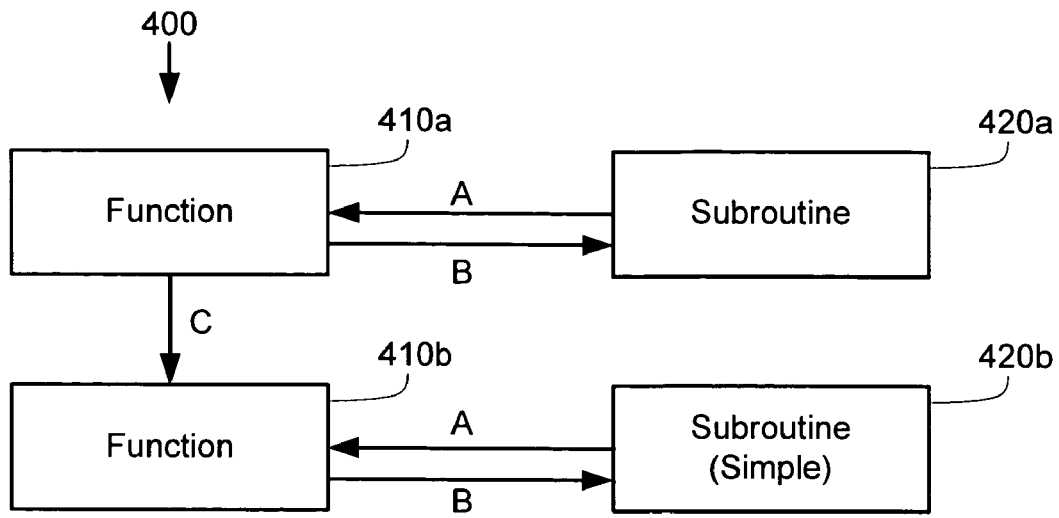
FIGS. 4A-B are block diagrams illustrating an example modification of a code flow in accordance with an embodiment of the present invention.
Figure 4B:
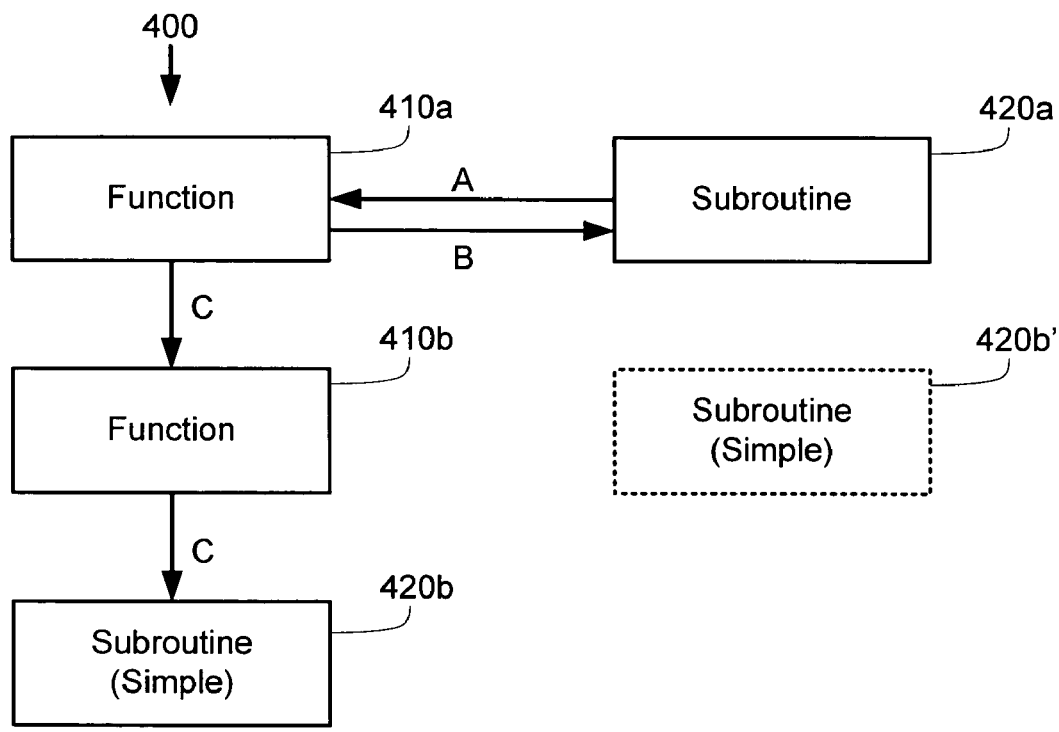

If one or more functions are determined to be simple in optional step 207, then at optional step 209 the functions are placed inline with the main body of the application code. As noted above, placing a code inline may entail copying the code from the subroutine or the like and replacing a corresponding function call in the main body with the subroutine code. A graphical representation of the effect of placing a function inline is illustrated in FIGS. 4A-B, to be discussed below. If the determination of step 207 is that no functions were determined to be simple in optional step 207, then method 200 proceeds directly to step 211.

At step 211, JIT translation of the emulated code takes place in connection with the code's execution by way of a runtime engine or the like. Because, as noted above, complex functions have been precompiled in step 205, such functions do not need to be translated at step 211 and may be executed directly. In addition, a context switch does not need to be performed for any functions that were placed inline at step 209.

As was noted above, the thresholds and factors used for determining whether a function is complex or simple (and therefore whether the function should be precompiled or placed inline, respectively) may be based on a variety of factors, including, but not limited to, the desired boot time of the application. Thus, it will be appreciated that an embodiment permits a developer or the like to determine an acceptable trade-off between the runtime benefit caused by such precompilation and/or inlining and the corresponding increase in boot time.

Figure 3:
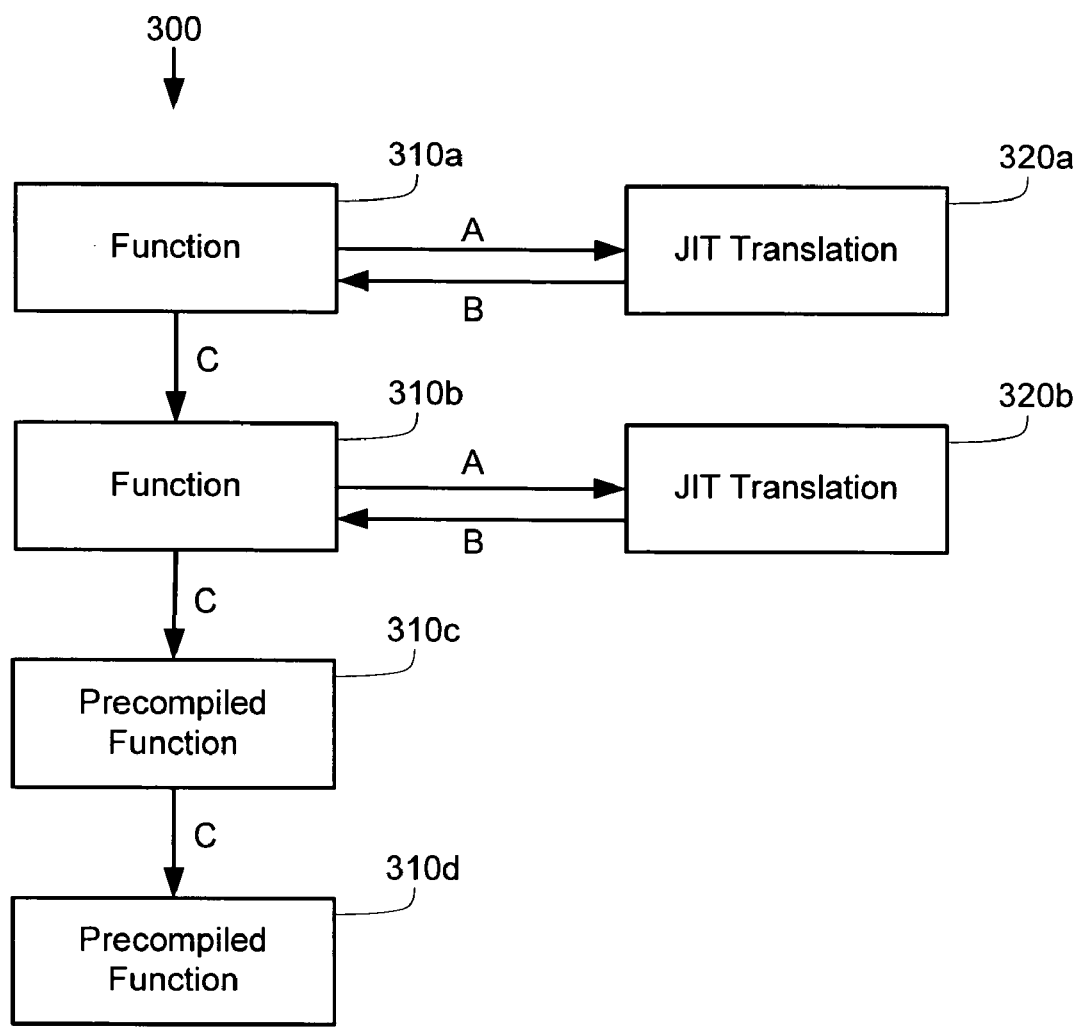
FIG. 3 is a block diagram illustrating an example code flow in accordance with an embodiment of the present invention.

FIG. 3 represents an example code flow in accordance with an embodiment. Functions 310a-d represent functions within the main body 300 of an application's virtual code. During runtime, function 310a is translated using JIT translation process 320a. The code flow is represented by arrow A that leads to JIT translation process 320a from function 310a, and then once JIT translation process 320a has completed, arrow B indicates that function 310a is then executed. The emulated binary then proceeds to function 310b by way of arrow C. Function 310b also undergoes JIT translation by process 320b, as represented by arrow A, and executed as represented by arrow B. Once the binary reaches precompiled function 310c, however, no JIT translation is required because precompiled function 310c, having already undergone translation in accordance with, for example, step 205 of FIG. 2, is ready to be executed. The same is true for precompiled function 310d. Thus, it can be seen that FIG. 3 provides an illustration of a modified JIT translation process that may occur in accordance with an embodiment.

FIGS. 4A-B illustrate an example code flow in connection with the inlining of code as was discussed above in connection with optional step 209 of FIG. 2. Referring to FIG. 4A, functions 410a-b are located within the main body 400 of an application. Subroutines 420a-b are called from functions 410a-b, respectively, as indicated by arrow A, and the result of subroutines 420a-b are returned to functions 410a-b as indicated by arrow B. As can be seen in FIG. 4A, subroutine 420b is designated as "simple," which indicates that it has, for example, less than a threshold number of code lines, as was discussed above in connection with step 207 of FIG. 2. The code flow from function 410a to function 410b within the main 400 is represented by arrow C.

Referring now to FIG. 4B, function 410a and subroutine 420a are as was discussed above in connection with FIG. 4A. However, it can be seen that function 410b does not contain a call to subroutine 420b. Instead, function 410b proceeds to subroutine 420b that has been placed in the main body 400 of the code. Thus, the call and return indicated by arrows A and B is avoided for subroutine 420b. Subroutine 420b' represents the memory occupied by the original subroutine 420b that is not used because its code has been copied to the main body 400 of the code.

While the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method, comprising:
scanning virtual code having a plurality of functions during a pre-boot scan;
performing a calculation during the pre-boot scan to determine whether a function of the plurality of functions is a complex function, wherein the calculation compares a runtime benefit of precompiling the function to an increase in boot-time caused by precompiling the fuction;
if the function is identified as a complex function according to the calculation, precompiling the complex function; and
performing a just-in-time translation of a remainder of the plurality of functions in the virtual code.

2. The method of claim 1, wherein the calculation includes utilizing a number of lines of code in the function to identify whether a function is a complex function.

3. The method of claim 1, wherein the calculation to determine whether the function of the plurality of functions is the complex function takes into account a measure of time it takes to boot up if the function is precompiled versus a duration of time it takes to boot up if the function is not precompiled.

4. The method of claim 1, wherein the virtual code has a main body and at least one subroutine, and further comprising:
determining that at the at least one subroutine is a complex function according to the calculation; and
placing the at least one subroutine in the main body of the virtual code.

5. The method of claim 4, wherein the at least one subroutine has a line of code and wherein the main body has a function call corresponding to the subroutine, and wherein said placing step comprises copying the line of code from the at least one subroutine and replacing the function call in the main body of the virtual code with the line of code.

6. A method, comprising:
  performing a pre-boot scan of an emulated binary of a software application;
  identifying a first function within the binary that exceeds a first predetermined threshold;
  identifying a second function within the binary that requires a context switch for execution and is below a second predetermined threshold;
  precompiling the first function;
  placing the second function inline in a main body of the emulated binary; and
  performing a just-in-time translation of the emulated binary.

7. The method of claim 6, wherein the just-in-time translation produces a second binary that is adapted to be executed by a predetermined processor.

8. The method of claim 7, further comprising executing the translated binary.

9. The method of claim 6, wherein the just-in-time translation is performed at a runtime of the software application.

10. The method of claim 6, wherein the software application is gaming software.

11. The method of claim 6, wherein the first and second functions relate to graphics rendering.

12. A computer-readable medium having computer-executable instructions for performing a method, the method comprising:
  scanning virtual code having a plurality of functions during a pre-boot scan;
  performing a calculation during the pre-boot scan to determine whether a function of the plurality of functions is a complex function, wherein the calculation compares a runtime benefit of precompiling the function to an increase in boot-time caused by precompiling the fuction;
  if the function is identified as a complex function according to the calculation, precompiling the complex function; and
  performing a just-in-time translation of a remainder of the plurality of functions in the virtual code.

13. The computer-readable medium of claim 12, wherein the virtual code has a main body and at least one subroutine, and further comprising:
  determining that at the at least one subroutine is a complex function according to the calculation; and
  placing the at least one subroutine in the main body of the virtual code.

14. The computer-readable medium of claim 13, wherein the at least one subroutine has a line of code and wherein the main body has a function call corresponding to the subroutine, and wherein said placing step comprises copying the line of code from the at least one subroutine and replacing the function call in the main body of the virtual code with the line of code.

* * * * *